July 24, 1956   B. T. HENSGEN ET AL   2,755,731
HAM PUMPING CONTROL DEVICE
Filed May 5, 1953

INVENTORS
BERNARD T. HENSGEN
JAMES J. PROHASKA
HOWARD G. REICHEL
BY R. G. Story
ATTORNEY

United States Patent Office 2,755,731
Patented July 24, 1956

2,755,731

HAM PUMPING CONTROL DEVICE

Bernard T. Hensgen and Howard G. Reichel, Chicago, and James J. Prohaska, La Grange, Ill., assignors to Swift & Company, Chicago, Ill., a corporation of Illinois Application May 5, 1953, Serial No. 353,148

6 Claims. (Cl. 99—256)

The present invention relates to an apparatus for use in the processing of meats, particularly cured meats.

In many instances the process of curing meats includes the step of injecting an amount of curing or flavoring liquid, commonly referred to as "pickle" into the meat. Because of economy, uniformity, and/or the effect of the requirements of governmental regulations, the usual practice is to have the amount of injected pickle bear a definite relationship by weight to the preinjection weight, usually referred to as the green weight, of the meat. In times past this has been done by weighing the meat cut, referring to a table to determine what should be the weight of that meat cut after the pickle has been added thereto and the injecting of pickle into the cut, while the cut remains on the scale, until the weight indicated by the scale is that obtained from the chart. Various semi-automatic devices have been proposed to reduce or eliminate the step of referring to a chart and the mental noting of what should be the weight of the cut after injection, but in general such devices tend to be complicated with delicate adjustments that may get out of order and require expert technicians to repair. The principal object of the invention is to provide an apparatus which does not require this mental step and yet the apparatus used is very simple in structure and operation, with little to get out of order. In addition, because of this simplicity, no highly skilled technical knowledge or experience is necessary to keep the device in operating condition and to return it to such condition should a malfunction occur.

A particular advantage of the invention is that the apparatus has a minimum of moving parts, with a majority of the parts either being stock items or being simply constructed, usually by ordinary metal working operations.

An additional object and advantage of the invention is that the apparatus may be used by relatively unskilled labor. Little is required in the way of preinstruction before operators can be permitted to proceed by themselves. No high degree of mental skill or knowledge is required of the operator.

Further objects and advantages will become apparent from the following description taken in conjunction with the drawings in which.

The method we have devised involves the translating of the weight of the meat cut into fluid pressures in two portions of an enclosed fluid. By a differential process the fluid pressure in one portion is measured and indicated in terms of the weight of the meat cut plus a given percentage of that weight, which additional amount represents the weight of the pickle to be added to the cut. This measurement is then fixed by isolating that portion of the fluid from the remainder of the fluid so that any further changes in pressure in the remainder do not affect the registering of the measurement. The pickle is then added to the meat cut while continuing to translate the total weight of the cut plus the pickle therein into pressure in the remaining fluid and measuring that pressure in terms of weight. When this latter measurement equals the fixed measurement initially set from the pressure in the one portion of the fluid, the meat cut has received the desired amount of pickle so that the flow thereof may be discontinued.

The drawings and the following description cover an embodiment practicing this method and in addition illustrate certain variations in the embodiment. The description of a specific embodiment is for the purpose of complying with 35 U. S. C. 112 and should not be construed as imposing unnecessary limitations upon the appended claims, inasmuch as other variations will be readily apparent to those skilled in the art.

Figure 1:
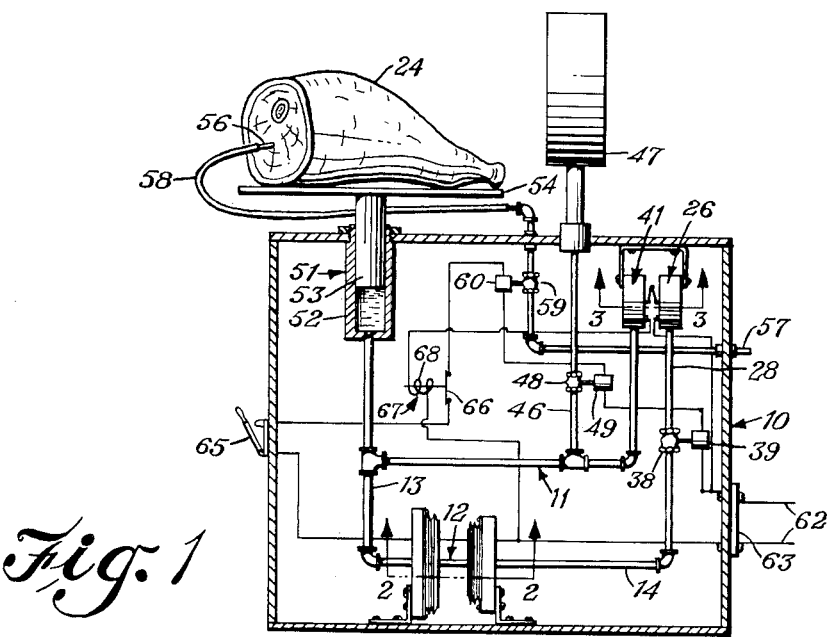
Figure 1 is an elevational view, partially diagrammatic and partially in section, of an embodiment of the invention.

Referring to Figure 1, a case, generally 10, forms the frame for the device. Within the case is a fluid system, generally 11, divided by a differential, generally 12, into two parts 13 and 14. As will be seen from the drawing, the major components of the fluid system 11 are standard pipe and fitting items.

Figure 2:
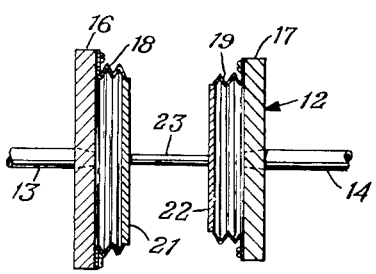
Figure 2 is a section taken at line 2—2 of Figure 1, on a slightly enlarged scale.

The structure of differential 12 is best illustrated in Figure 2. It comprises a pair of base plates 16 and 17 to which are secured bellows 18 and 19, respectively. Bellows 18 has an inflexible outer plate 21, while bellows 19 has a similar plate 22. A rod 23 interconnects plates 21 and 22. The areas of plates 21 and 22 varies, with the amount of variance being determined by the percentage by weight of pickle to be added to the meat cut, so as to produce a fluid pressure in portion 14 of the fluid system the same percentage greater than the fluid pressure in portion 13 of the system. For example, if the weight of pickle to be added to the ham 24 is 10% of the green weight of the ham, the area of plate 22 should be 90.9% of the area of plate 21, whereby the pressure in portion 14 will be 110% of the pressure in portion 13 of the system.

Figure 3:
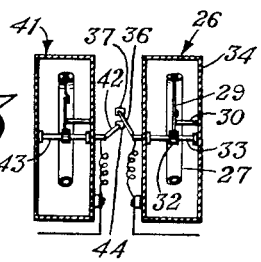
Figure 3 is a section taken at line 3—3 of Figure 1 on an enlarged scale.

The fluid pressure in portion 14 of the system is measured by a Bourdon gauge, generally 26, best illustrated in Figure 3, with the Bourdon tube 27 of the gauge communicating with pipe 28 of portion 14 of the system. The free end of tube 27 is connected to an arcuate rack 29 pivotally mounted on a pin 30. A pinion 32 secured to a shaft 33 engages rack 29. Shaft 33 is journaled in case 34 of gauge 26. At one end of shaft 33 projects an arm 36 having a detector 37 at the unsupported end thereof. In the illustrated embodiment the detector 37 takes the form of an electrical contact. Preferably shaft 33 is formed of a nonconductive material to prevent shorting the electrical wiring hereinafter described.

Means are provided whereby the portion of the fluid system with which the gauge 26 communicates may be isolated from the remainder of the system so that changes in fluid pressure in the remainder of the system will not be reflected in a change in the fluid pressure in said portion. In the illustrated embodiment this takes the form of a valve 38 having a solenoid actuator thereon.

Communicating with portion 13 of the system is a second gauge, generally 41, the structure of which is identical with that of gauge 26 except that arm 42 of gauge 41 is mounted on the other end of shaft 43 thereof. Shafts 33 and 43 are mounted on a common axis of rotation and positioned so that detector 44 of gauge 41, which detector again takes the form of an electrical contact in the illustrated embodiment, and detector 37 of gauge 26 move along a common path.

Portion 13 of the fluid system 11 also includes a branch pipe 46 leading to a large pressure gauge 47 of conventional design, the dial of which gauge is calibrated to indicate the weight in pounds of the ham 24 on the scale. Interposed along pipe 46 is a valve 48 controlled by solenoid 49.

A means, generally 51, is connected to system 11 to apply a pressure on the fluid therein proportional to the weight of the object, in the illustrated case, ham 24, to be weighed. In the embodiment of Figure 1, the translating means 51 comprises a cylinder 52 in communication with the fluid system 11, and a piston 53. To the upper end of piston 53 is secured a supporting plate 54 on which the objects to be weighed can be rested.

The pickle is injected into the meat cut through a needle 56. A pipe 57 leads to a suitable supply source (not shown) of pickle or other liquid to be injected. A flexible hose 58 connects needle 56 with pipe 57. Interposed in pipe 57 is a control valve 59 which is actuated by solenoid 60.

The electrical control system is shown diagrammatically in Figure 1. Wires 62 lead to a suitable source of electrical supply and are connected to a terminal board 63. Two separate series circuits are connected to terminal board 63.

The first of these series circuits includes a switch, diagrammatically shown at 65, normally closed contact 66 of a relay generally 67, and the three solenoids 60, 39, and 49, respectively. It should be noted that valves 38 and 48 are normally open and are closed when solenoids 39 and 49, respectively, are energized. Valve 59 on the other hand is normally closed, and is opened when solenoid 60 is energized.

A second of these series circuits from terminal board 63 comprises the coil 68 of relay 67 and the two contacts of detectors 44 and 37.

The embodiment of Figure 1 is operated as follows: The ham 24 with the needle 56 connected thereto is placed upon platform 54, which causes the weight thereof to appear in all portions of system 11 as fluid pressure proportional to the weight of the ham. However, because of differential 12, the pressure appearing in portion 14 of the system is greater by a predetermined percentage than the pressure appearing in portion 13 of the system. These pressures will cause arms 36 and 42 of gauges 26 and 41, respectively, to move along their paths of travel, with arm 36 turning an angular distance greater than the angular distance turned by arm 42. The difference in the angular amount of movement again varies by said predetermined percentage. The weight of the ham is indicated on the dial of gauge 47.

Switch 65 is now closed, completing the series circuit through contact 66 and solenoids 60, 49, and 39, thereby opening valve 59 and closing valves 38 and 48. The closing of valve 38 in effect disconnects gauge 26 from the fluid system and retains the setting of arm 36 thereof at the point determined by the initial weight of ham 24. It will be apparent that the operation will be the same should the position of differential 12 and of valve 38 be interchanged in the system. At the same time the closing of valve 48 disconnects gauge 47 from the system to hold the setting on the dial thereof showing the initial weight of the ham. This retention of the initial weight of the ham on the dial of gauge 47 is for the purpose of facilitating the completion of the pumping of a ham should there be a failure in the system during the pumping. If by some chance there should be a subsequent failure, the ham may merely be put on another scale and sufficient pickle added to bring the weight of the ham plus the pickle up to what it should be for the initial weight of the ham, which was retained on gauge 47.

The opening of valve 59 allowed the pickle to commence flowing into the ham. As this occurred the pressure in the portion 13 of the fluid system continued to increase, with that increase being reflected in the angular setting of arm 42 of gauge 41. When the pressure in portion 13 reaches the pressure initially established in portion 14 by the action of differential 12, the two detectors 37 and 44 will reach a common point on their paths of travel and the contacts thereof will close. With the closing of the contacts a series circuit is established through coil 68 of relay 67 to open the relay contact 66. The opening of the contact 66 of relay 67 breaks the series circuit through the three solenoids 60, 49, and 39, to close valve 59 shutting off the flow of pickle and opening valves 48 and 38 for the next cycle. When this occurs the operator also opens switch 65. It will be apparent that since the initial pressures in portions 13 and 14 differed by a predetermined amount established by differential 12 and the pressure in portion 13 was subsequently brought up to the initial pressure in portion 14 by the addition of pickle to the ham at which time the flow of pickle was stopped, that the amount of pickle added to the ham was said predetermined amount of the initial weight of the ham.

With no load on the scale the contacts of detectors 37 and 44 will meet at zero to energize relay 67 and open contacts 66. This prevents any accidental closing of switch at that time from energizing solenoid 60 and opening valve 59. As soon as the contacts move away from zero the relay 67 drops closed to set the system for operation as described.

Figure 4:
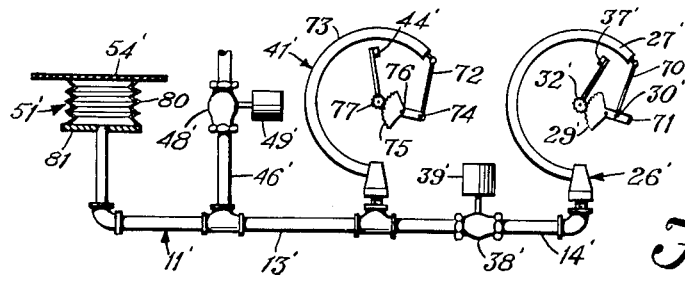
Figure 4 is a partial, diagrammatic, view of an alternative embodiment of the invention.

Figure 4 illustrates certain modifications that may be made in the apparatus of Figure 1, while still practicing the method initially described. As in the case of the first embodiment the fluid system, generally 11', is divided into two portions 13' and 14'. The two gauges, generally at 26' and 41' are connected to the two portions 14' and 13', respectively. As before, the gauges are positioned coaxially so that the two detectors 37' and 44' rotate along a common path. It should be understood that Figure 4 is a diagrammatic representation and the actual physical position of the two gauges 26' and 41' would correspond to that illustrated for the gauges 26 and 41 in Figure 1. The important difference between the embodiment of Figure 1 and the embodiment of Figure 4 is that the increase in movement of the arm of gauge 26' over that of gauge 41' which is obtained by reason of the mechanical structure in the gauges rather than through the use of a pressure differential mechanism such as that illustrated at 12 in the embodiment of Figure 1.

With respect to gauge 26', pinion 32' is rotated by curvilinear rack 29' pivoted about a pin 30'. The link 70 that interconnects the Bourdon tube 27' and the arm 71, secured to rack 29', is relatively close to pin 30', where it is secured to arm 71. In gauge 41' the link 72 that interconnects the Bourdon tube 73 and arm 74 of rack 75 is positioned on arm 74 a greater distance from pin 76. Thus, for a given movement of Bourdon tube 27' in response to a change in pressure in system 11', arm 71 of gauge 26' will have a greater angular rotation than will arm 74 in response to the same change in pressure and same movement of Bourdon tube 73 of gauge 41'. Correspondingly the angular movement of pinion 32' and detector 37' will be greater than the angular movement of pinion 77 and detector 44'. The difference in angular movement is proportioned by the length of arms 71 and 74, as measured between link 70 and pin 30' and between link 72 and pin 76, respectively, to achieve a percentage difference corresponding to the percentage of the weight of the meat cut that is to be added to the cut in the form of pickle. The same variation may be achieved by a difference in size of pinions 32' and 77, which difference in the illustrated embodiment would be so small as to be substantially non-detectible in the drawing.

A further change in the embodiment of Figure 4 is in the details of the weight translating means, generally 51'. It will be noted that in Figure 4 translating means 51' takes the form of a bellows 80 interposed between a base plate 81 and supporting plate 54'. The interior of the bellows 80 communicates with the fluid system 11'.

Except for the foregoing changes the remainder of the structure of the embodiment of Figure 4 corresponds to that illustrated in Figure 1. When the ham 24 is placed upon the supporting plate 54', detector 37' moves along the common path a predetermined percentage greater than the movement of detector 44' along the same path. The closing of switch 65 energizes solenoid 39' to close valve 38' shutting off portion 14' of the system from portion 13' thereof and fixing the position of detector 37'. As previously explained, this also starts the flow of pickle into the ham, with detector 44' continuing to rotate in response to the increase in pressure in portion 13' of the fluid system. When the two detectors reach a common point on their path of movement the circuit is broken through the pickle supply solenoid to shut off the pickle.

We claim:

1. A scale for use in the processing of meats to which a pickle is added, said scale including pressure responsive means having a pair of arms a portion of which is movable along a common path in response to a change in the pressure applied to said means, and a pair of detectors on said arms to actuate an electrical circuit as said arms reach a common point on said path, means forming an enclosed fluid system connected to said pressure responsive means, one of said means being adapted to cause one of said arms to move along said path in response to a change in pressure in the system a distance that differs by a given percentage from the distance moved by the other arm in response to the same change in pressure, selective means to prevent changes in pressure from resulting in movement of said one arm, a conduit through which pickle is supplied to said meat, an electrically actuated valve in said conduit, said detectors being connected to said valve to actuate said valve, and means for applying the weight of the ham to the fluid in the system.

2. A scale for use in the processing of meats to which a pickle is added, said scale including means forming an enclosed fluid system, fluid pressure responsive means connected to said fluid system, said responsive means having a pair of contacts movable along a common path in response to a change in pressure in said system, said means including a mechanism to cause one of said contacts to move along said path in response to a change in pressure in the system a distance that differs by a given percentage from the distance moved by the other contact in response to the same change in pressure, means selectively to prevent changes in pressure from resulting in movement of said one contact, a conduit through which pickle is supplied to said meat, a solenoid actuated valve in said conduit, an electrical circuit means interconnecting the solenoid of said valve and said contacts to close said valve upon the closing of said contacts, and means for applying the weight of said ham to the fluid in said system.

3. A scale for use in the processing of meats to which a pickle is added, said scale including means forming an enclosed fluid system, fluid pressure responsive means connected to said fluid system, said responsive means comprising a pair of rotatable shafts having a common axis of rotation, a pair of arms each having a contact on the end thereof, each of said arms being mounted on one of said shafts for movement of said contacts along a common path, and a pair of Bourdon tubes each operatively connected to one of said shafts to rotate said shafts in response to changes in pressure applied to said tubes by said system, one of said means being adapted to cause one of said contacts to move along said path in response to a change in pressure in the system a distance that differs by a given percentage from the distance moved by the other contact in response to the same change in pressure, means selectively to prevent changes in pressure from resulting in movement of said one contact, a conduit through which pickle is supplied to said meat, a solenoid actuated valve in said conduit, an electrical circuit means interconnecting the solenoid of said valve and said contacts to close said valve upon the closing of said contacts, and means for applying the weight of said ham to the fluid in said system.

4. A scale for use in the processing of meats to which a pickle is added, said scale including a pair of pressure responsive means, each of said means having an arm, a portion of each of said arms being movable along a common path in response to a change in the pressure applied to said means, said means each having a detector on said portion of said arms to actuate an electrical circuit so said arms reach a common point on said path, an enclosed fluid system connected to each of said responsive means, a pressure differential interposed in the portion of said system connecting only to one of said responsive means, a valve in said portion of said system by which said responsive means may be isolated from the remainder of the system to prevent pressure changes in the remainder of the system from resulting in movement of the arm of said means, a conduit through which pickle is supplied to said meat, an electrically actuated valve in said conduit, said detectors being connected to said valve to actuate said valve, and means for applying the weight of the ham to the fluid in the system.

5. A scale for use in the processing of meats to which a pickle is added, said scale including a pair of pressure responsive means, each of said means having an arm, a portion of each of said arms being movable along a common path in response to a change in the pressure applied to said means, said means each having an electrical contact on said portion of said arms to actuate an electrical circuit as said arms reach a common point on said path, an enclosed fluid system connected to each of said responsive means, a pressure differential interposed in the portion of said system connecting only to one of said responsive means, said differential comprising a pair of bellows of different cross-sectional areas, said bellows each having one side thereof rigidly connected to the side of the other bellows, a valve in said portion of said system by which said responsive means may be isolated from the remainder of the system to prevent pressure changes in the remainder of the system from resulting in movement of the arm of said means, a conduit through which pickle is supplied to said meat, a solenoid actuated valve in said conduit, an electrical circuit means interconnecting the solenoid of said valve and said contacts to close the valve upon the closing of said contacts, and means for applying the weight of said ham to the fluid in said system.

6. A scale for use in the processing of meats to which a pickle is added, said scale including means forming an enclosed fluid system, fluid pressure responsive means connected to said fluid system, said responsive means comprising a pair of rotatable shafts having a common axis of rotation, a pair of arms each having a contact on the end thereof, each of said arms being mounted on one of said shafts for movement of said contacts along a common path, and a pair of Bourdon tubes each operatively connected to one of said shafts to rotate said shafts in response to changes in pressure applied to said tubes by said system, one of said responsive means having the tube thereof connected to the shaft thereof to rotate said shaft through a greater angle in response to a pressure change in said system than the angle of rotation of the shaft of the other means in response to the same pressure change, a valve in portion of the system leading only to said one responsive means by which said responsive means may be isolated from the remainder of the system to prevent pressure changes in remainder of the system from resulting in movement of the arm of said means, a conduit through which pickle is supplied to said meat, a solenoid actuated valve in said conduit, an electrical circuit means interconnecting the solenoid of said valve and said contacts to close the valve upon the closing of the contacts, and means for applying the weight of said ham to the fluid in said system.

References Cited in the file of this patent

UNITED STATES PATENTS

| | | |
|---|---|---|
| 2,084,864 | Paddock | June 22, 1937 |
| 2,501,247 | Williams | Mar. 21, 1950 |
| 2,501,248 | Williams | Mar. 21, 1950 |
| 2,528,204 | Zwosta | Oct. 31, 1950 |